(12) United States Patent
Kawahara et al.

(10) Patent No.: US 7,952,793 B2
(45) Date of Patent: May 31, 2011

(54) ELECTROPHORETIC PARTICLES, ELECTROPHORETIC PARTICLE DISPERSION, DISPLAY MEDIUM AND DISPLAY DEVICE

(75) Inventors: Jun Kawahara, Minamiashigara (JP); Nami Tokunaga, Minamiashigara (JP); Daisuke Nakayama, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 12/724,067

(22) Filed: Mar. 15, 2010

(65) Prior Publication Data

US 2011/0063714 A1    Mar. 17, 2011

(30) Foreign Application Priority Data

Sep. 11, 2009    (JP) .................. 2009-210643

(51) Int. Cl.
*G02B 26/00* (2006.01)
*G09G 3/34* (2006.01)
(52) U.S. Cl. ....................... 359/296; 345/107
(58) Field of Classification Search .................. 359/296; 345/107; 430/32; 204/600
See application file for complete search history.

(56) References Cited

U.S. PATENT DOCUMENTS

| | | | |
|---|---|---|---|
| 5,622,804 A | 4/1997 | Matsuoka et al. | |
| 5,723,250 A | 3/1998 | Matsuoka et al. | |
| 5,863,684 A | 1/1999 | Suzuki et al. | |
| 6,956,690 B2 * | 10/2005 | Yu et al. | 359/296 |
| 2002/0044333 A1 | 4/2002 | Shigehiro et al. | |
| 2005/0136347 A1 | 6/2005 | Gu et al. | |

FOREIGN PATENT DOCUMENTS

| | | | |
|---|---|---|---|
| JP | 07-325434 A | 12/1995 | |
| JP | 10-003177 A | 1/1998 | |
| JP | 2002-072256 A | 3/2002 | |
| JP | 2006-010937 A | 1/2006 | |
| JP | 2007-121570 A | 5/2007 | |
| JP | 2007-534006 A | 11/2007 | |
| WO | 2005/047962 A2 | 5/2005 | |

* cited by examiner

*Primary Examiner* — William C Choi
(74) *Attorney, Agent, or Firm* — Sughrue Mion, PLLC

(57) ABSTRACT

An electrophoretic particle dispersion including: electrophoretic particles including first particles having a surface thereof covered with a curvature-adjustment portion formed from a curvature-adjustment material, a curvature at the surface of the curvature-adjustment portion being greater than the curvature of the first particles that do not include the curvature-adjustment portion; a crosslinking agent capable of binding the electrophoretic particles via a reversible crosslinked structure; and a dispersing medium in which the electrophoretic particles and the crosslinking agent are dispersed.

19 Claims, 8 Drawing Sheets

<OBSERVED COLOR : MAGENTA>

<OBSERVED COLOR : WHITE>

ELECTROPHORETIC PARTICLES, ELECTROPHORETIC PARTICLE DISPERSION, DISPLAY MEDIUM AND DISPLAY DEVICE

CROSS-REFERENCE TO RELATED APPLICATION

This application is based on and claims priority under 35 USC 119 from Japanese Patent Application No. 2009-210643 filed Sep. 11, 2009.

BACKGROUND

The invention relates to electrophoretic particles, an electrophoretic particle dispersion, a display medium, and a display device.

RELATED ART

A display device employing a three-valued electrophoretic system, which displays an image in a manner whereby each pixel displays multiple colors (a single-pixel multi-color display system), is expected to bring into realization electronic paper media that can display a high-quality color image. In order to realize the single-pixel multi-color display system, it is necessary that the value of threshold voltages to be applied to electrophoretic particles of the display device is controlled, and that the values of threshold voltages of the electrophoretic particles of different colors are different.

SUMMARY

According to an aspect of the invention, there is provided an electrophoretic particle dispersion comprising:

electrophoretic particles comprising first particles having a surface thereof covered with a curvature-adjustment portion formed from a curvature-adjustment material, a curvature at the surface of the curvature-adjustment portion being greater than the curvature of the first particles that do not comprise the curvature-adjustment portion;

a crosslinking agent capable of binding the electrophoretic particles via a reversible crosslinked structure; and a dispersing medium in which the electrophoretic particles and the crosslinking agent are dispersed.

BRIEF DESCRIPTION OF THE DRAWINGS

Exemplary embodiments of the present invention will be described in detail based on the following figures, wherein.

DETAILED DESCRIPTION

In the following, details of the present invention are described.

<Electrophoretic Particle Dispersion>

First exemplary embodiment (including a single kind (single color) of electrophoretic particles)

The electrophoretic particle dispersion according to this exemplary embodiment includes electrophoretic particles that are formed from first particles (hereinafter, referred to as "mother particles" sometimes) having the surface thereof covered with a curvature-adjustment portion formed from a curvature-adjustment material, a curvature at the surface of the curvature-adjustment portion being greater than the curvature of the first particles that do not include the curvature-adjustment portion; and a crosslinking agent that can bind the electrophoretic particles via a reversible crosslinked structure; and a dispersing medium in which the electrophoretic particles and the crosslinking agent are dispersed.

Another exemplary embodiment of the electrophoretic particle dispersion includes electrophoretic particles formed from first particles (hereinafter, referred to as "mother particles" sometimes) having the surface covered with second particles having a smaller average particle diameter than the first particles (hereinafter, referred to as "external particles" sometimes); a crosslinking agent that can bind the second particles of one electrophoretic particle with the second particles of another electrophoretic particle via a reversible crosslinked structure; and a dispersing medium in which the electrophoretic particles and the crosslinking agent are dispersed.

Figure 1A:
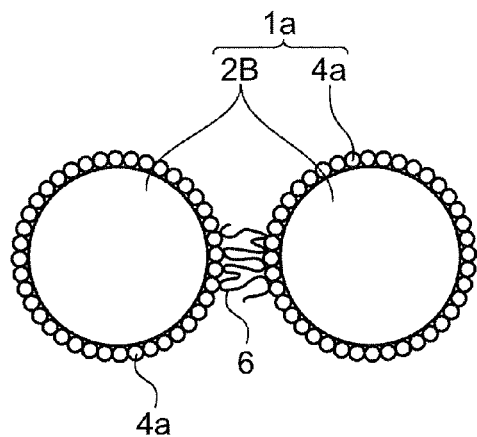
FIG. 1A is a schematic view showing electrophoretic particles of the same kind that are bound to each other via a crosslinking agent.

FIG. 1A schematically shows electrophoretic particles and a crosslinking agent according to this exemplary embodiment. FIG. 1A shows two electrophoretic particles 1a each including a mother particle (first particle) 2B having the surface thereof covered with external particles 4a having a smaller particle diameter than the mother particle 2B; and a crosslinking agent 6 that binds external particles 4a that cover the surface of one mother particle 2B with external particles 4a that cover the surface of the other mother particle 2B via a reversible crosslinked structure.

External particles 4a function as a curvature-adjustment material as mentioned above, and the curvature at the surface of external particles 4a is greater than the curvature of mother particle 2B not including external particles 4a.

In this case, the curvature-adjustment material that forms the curvature-adjustment portion may be in the form of particles as mentioned above, or may be in the form of a film having surface irregularities that covers the surface of mother particle. When the curvature-adjustment material is in the form of particles, the "curvature at the surface of curvature-adjustment portion" refers to the curvature of the particles per se that serve as the curvature-adjustment material. When the curvature-adjustment material is in the form of a film having surface irregularities, the "curvature at the surface of curvature-adjustment portion" refers to the curvature of the surface irregularities.

The state of being "bound via a reversible crosslinked structure" refers to a state in which, in an electrophoretic display medium, when one of the electrophoretic particles being attached to one of the substrates moves to separate from the other particles, the particle becomes unbound from the other particles; and when the electrophoretic particles reach the other substrate, the electrophoretic particles are bound with each other again via a crosslinked structure. The adsorption force formed between the electrophoretic particles via a reversible crosslinked structure is adjusted to be smaller than the adsorption force formed between the electrophoretic particles and the substrate.

The coverage of the electrophoretic particles, i.e., the ratio of surface area of a mother particle covered with external particles, is preferably 50% or more, which is preferably closer to 100%.

In the electrophoretic particle dispersion according to this exemplary embodiment, as mentioned above, the surface of the mother particles of the electrophoretic particles is covered with external particles, and a crosslinking agent binds the external particles that cover the surface of one mother particle with the external particles that cover the surface of another mother particle via a reversible crosslinked structure. Because of this structure, the threshold voltage of the electrophoretic particles can be increased by regulating the average particle diameter of external particles that cover the surface of mother particles, and by regulating the curvature of the external particles that function as a curvature-adjustment material.

In the following, the expression "binding external particles that cover the surface of one mother particle with the external particles that cover the surface of another mother particle" may be referred to as "binding the electrophoretic particles" sometimes.

The reason why the threshold voltage of the electrophoretic particles can be increased by regulating the average particle diameter of the external particles (i.e., the curvature of the curvature-adjustment portion) is not quite clear, but is presumed to be as follows.

When the values of the curvature of the crosslinking agent and the external particles are closer to each other, the number of sites at which adsorption of the crosslinking agent and the external particles occurs is increased. As a result, the crosslinking agent is adsorbed to the external particles more strongly, and the threshold voltage shifts to a higher level.

Further, since the curvature of the crosslinking agent is greater than that of the mother particles, the curvature of the electrophoretic particles (mother particles) covered with external particles, which have a smaller average particle diameter than the mother particle, is closer to the curvature of the crosslinking agent, as compared with the mother particles that are not covered with external particles. As a result, it is presumed that the threshold voltage shifts to a higher level.

The curvature of the crosslinking agent can be expressed as an inverse number of the radius of inertia of the crosslinking agent (polymer compound).

<Behavior of Electrophoretic Particles of the Same Kind (Same Color)>

In the following, by referring to FIGS. 2A to 2D, the behavior of electrophoretic particles (negatively charged) of one kind upon application of a voltage in a display medium that contains the electrophoretic particle dispersion according to this exemplary embodiment of the invention.

In the following explanation, the value of threshold voltage of electrophoretic particles $1a$ is determined as $\alpha$ (V), and the voltage applied to electrodes 8A and 8B is determined as E (V).

Figure 2A:
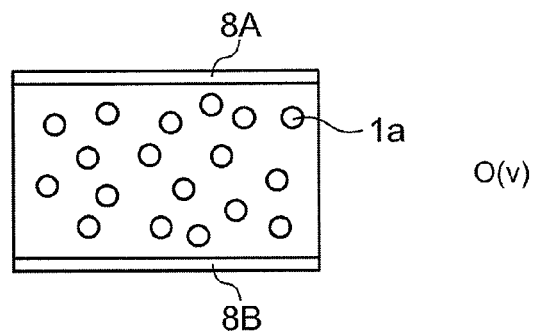
FIGS. 2A to 2D are schematic views showing the behavior of electrophoretic particles in the display medium that contains the electrophoretic particle dispersion according to an aspect of the invention, wherein the dispersion includes one kind of electrophoretic particles.

FIG. 2A shows electrophoretic particles $1a$ that are dispersed in the electrophoretic display medium with no application of voltage to electrodes 8A and 8B. At this time, the electrophoretic particles are not bound to each other by the crosslinking agent.

Figure 2B:
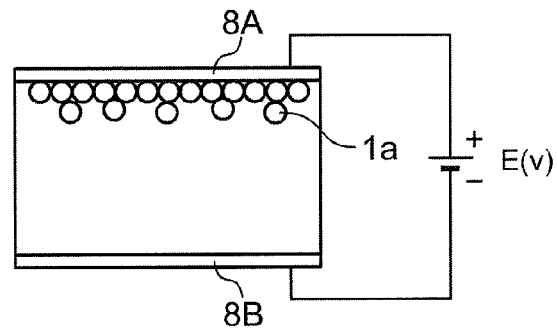

When a voltage greater than the threshold voltage of electrophoretic particles $1a$ (E>$\alpha$) is applied to electrodes 8A and 8B, as shown in FIG. 2B, electrophoretic particles $1a$ move to the side of electrode 8A. At this time, the electrophoretic particles $1a$ that have moved to the side of electrode 8A are bound to each other by the crosslinking agent.

Then, when a voltage of the opposite polarity that is smaller than the threshold voltage of electrophoretic particles $1a$ (E<$\alpha$) is applied to electrodes 8A and 8B, the electrophoretic particles remain to be bound and remain at the side of electrode 8A.

Figure 2C:
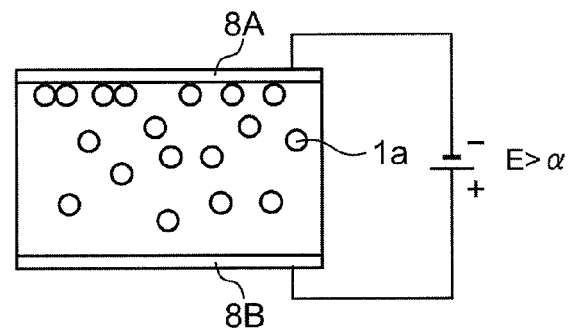
Figure 2D:
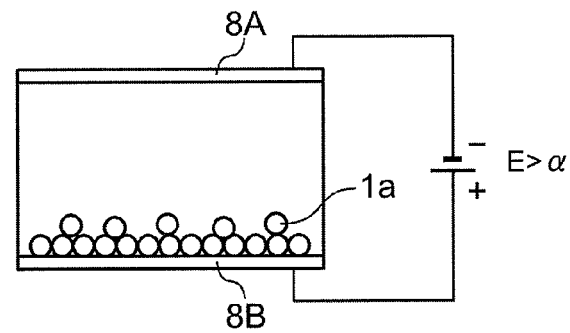

As shown in FIG. 2C, when a voltage greater than the threshold voltage of electrophoretic particles $1a$ (E>$\alpha$) is applied to electrodes 8A and 8B, electrophoretic particles $1a$ start to move from electrode 8A to electrode 8B. The electrophoretic particles $1a$ that have left electrode 8A become unbound. However, as shown in FIG. 2D, when electrophoretic particles $1a$ reach the side of electrode 8B, they are bound to each other again by the crosslinking agent.

As mentioned above, the behavior of electrophoretic particles $1a$ can be regulated by controlling the voltage applied to electrodes 8A and 8B. At this time, when an image is displayed at the side of electrode 8A, the color of electrophoretic particles $1a$ is observed in the state as illustrated in FIG. 2B, but the color of electrophoretic particles $1a$ is not observed in the state as illustrated in FIG. 2D.

Second Exemplary Embodiment

Including Two Kinds (Two Colors) of Electrophoretic Particles

The electrophoretic particle dispersion according to this exemplary embodiment may include two or more kinds of electrophoretic particles having different colors. In this case, the two or more kinds of electrophoretic particles preferably have different curvatures at the surface of the curvature-adjustment portion thereof. Moreover, in this case, the two or more kinds of electrophoretic particles preferably include a curvature-adjustment material of the same kind, and preferably include only one kind of crosslinking agent.

Further, the two or more kinds of electrophoretic particles preferably have external particles (second particles) having different average particle diameters, which also applies to other exemplary embodiments of the electrophoretic particle dispersion. Moreover, in this case, the two or more kinds of electrophoretic particles preferably include external particles (second particles) formed from the same material, and preferably include only one kind of crosslinking agent.

Figure 1B:
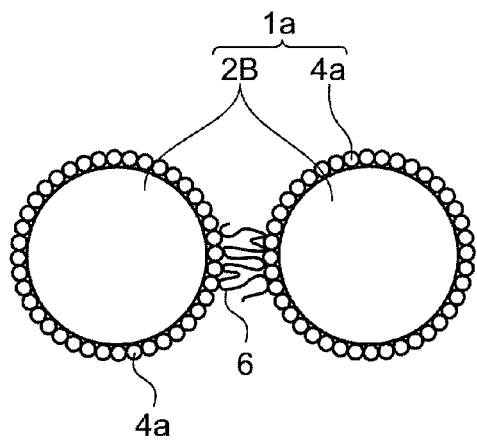
FIGS. 1B and 1C are schematic views showing electrophoretic particles of two kinds that are bound to each other via a crosslinking agent.
Figure 1C:
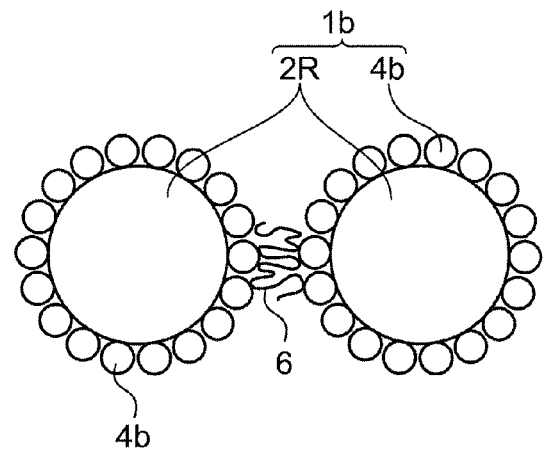

FIG. 1B shows an exemplary embodiment including two kinds of electrophoretic particles $1a$ having different colors and a crosslinking agent. In FIG. 1B, the surface of mother particles 2B is covered with external particles $4a$ having a smaller average particle diameter than mother particles 2B, and external particles $4a$ that cover one of mother particles 2B are bound to external particles $4a$ that cover another one of mother particles 2B, via a reversible crosslinked structure formed by crosslinking agent 6.

On the other hand, in electrophoretic particles $1b$, mother particles 2R having a different color than that of mother particles 2B are covered with external particles $4b$ having an average diameter that is smaller than that of mother particles 2R but greater than that of external particles $4a$. External particles $4b$ that cover one of mother particles 2B are bound to external particles 4b that cover another one of mother particle 2B, via a reversible crosslinked structure formed by crosslinking agent 6.

External particles 4a and 4b function as a curvature-adjustment material as mentioned above, and the curvatures at the surface of external particles 4a and 4b are greater than the curvatures of mother particles 2B and 2R not including external particles 4a and 4b, respectively.

<Behavior of Electrophoretic Particles of Two Kinds (Two Colors)>

In the following, by referring to FIGS. 3A to 3D, the behavior of two kinds of electrophoretic particles (positively charged electrophoretic particles and negatively charged electrophoretic particles) upon application of a voltage in a display medium that contains the electrophoretic particle dispersion according to this exemplary embodiment of the invention.

Display device 10 illustrated in FIGS. 3A to 3D includes display medium 12, voltage application unit 16 that applies a voltage to display medium 12, and a control unit 18.

Display medium 12 includes a display substrate 20 at which an image is displayed; rear substrate 22 that faces display substrate 20 via a space; spacers 24 that divide the space between display substrate 20 and rear substrate 22 into plural cells; and in each of these cells, electrophoretic particles 34 (positively charged) and electrophoretic particles 35 (negatively charged) having a different color and a polarity from that of electrophoretic particles 34.

The cells each include the electrophoretic particle dispersion according to this exemplary embodiment. Therefore, each cell includes a dispersing medium 50 in which electrophoretic particles 34, electrophoretic particles 35, and a crosslinking agent (not shown) are dispersed. Electrophoretic particles 34 and 35 include external particles formed from the same material, and the electrophoretic particle dispersion includes only one kind of crosslinking agent. Electrophoretic particles 35 are covered with external particles having a greater average particle diameter than the external particles that cover electrophoretic particles 34. Therefore, the threshold voltage of electrophoretic particles 35 is adjusted so as to be greater than the threshold voltage of electrophoretic particles 34.

In the following explanation, the voltage applied to front electrode 40 and rear electrode 46 is determined as E (V), the value of threshold voltage of electrophoretic particles 34 is determined as a (V), and the value of threshold voltage of electrophoretic particles 35 is determined as A (V) (A>α).

Figure 3A:
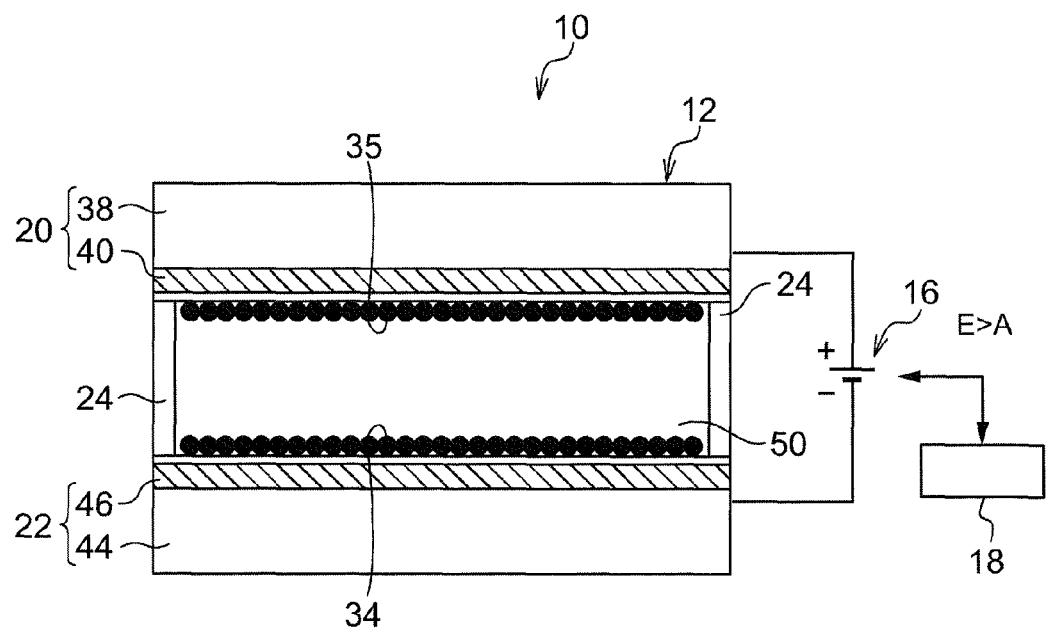
FIGS. 3A to 3D are schematic views showing the behavior of electrophoretic particles in the display medium that contains the electrophoretic particle dispersion according to an aspect of the invention, wherein the dispersion includes two kinds of electrophoretic particles.

When a voltage greater than the threshold voltages of both electrophoretic particles 34 and 35 (E>A) is applied between front electrode 40 and rear electrode 46, as shown in FIG. 3A, electrophoretic particles 34 move to the side of rear electrode 46 while electrophoretic particles 35 move to the side of display substrate 40. At this time, electrophoretic particles 34 that have moved to the side of front electrode 40 and electrophoretic particles 35 that have moved to the side of rear electrode 46 are bound to each another, respectively, by the crosslinking agent. The color observed from the side of front electrode 40 is the color of electrophoretic particles 35.

Figure 3B:
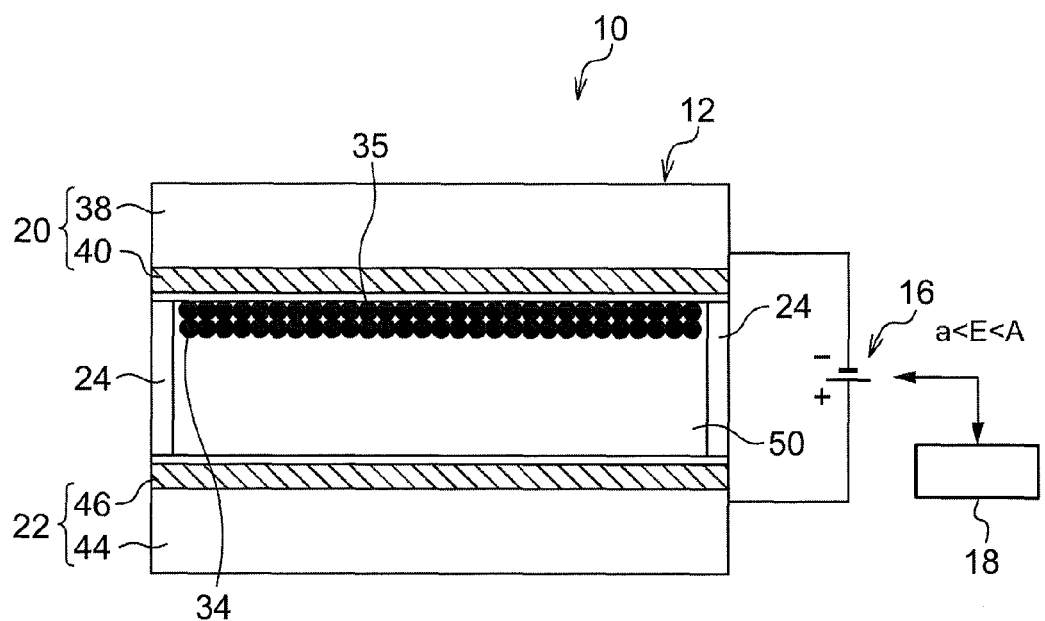

Subsequently, when a voltage of the opposite polarity that is greater than the threshold voltage of electrophoretic particles 34: a (V) but smaller than the threshold voltage of electrophoretic particles 35: A (V) (a<E<A) is applied between front electrode 40 and rear electrode 46, as shown in FIG. 3B, electrophoretic particles 34 move to the side of front electrode 40 while electrophoretic particles 35 remain at the side of front electrode 40. At this time, electrophoretic particles 34 that are about to move from rear electrode 46 become unbound, but are bound again when electrophoretic particles 34 reach the side of front electrode 40. The color observed from the side of front electrode 40 is a mixed color of the colors of electrophoretic particles 34 and 35.

Figure 3C:
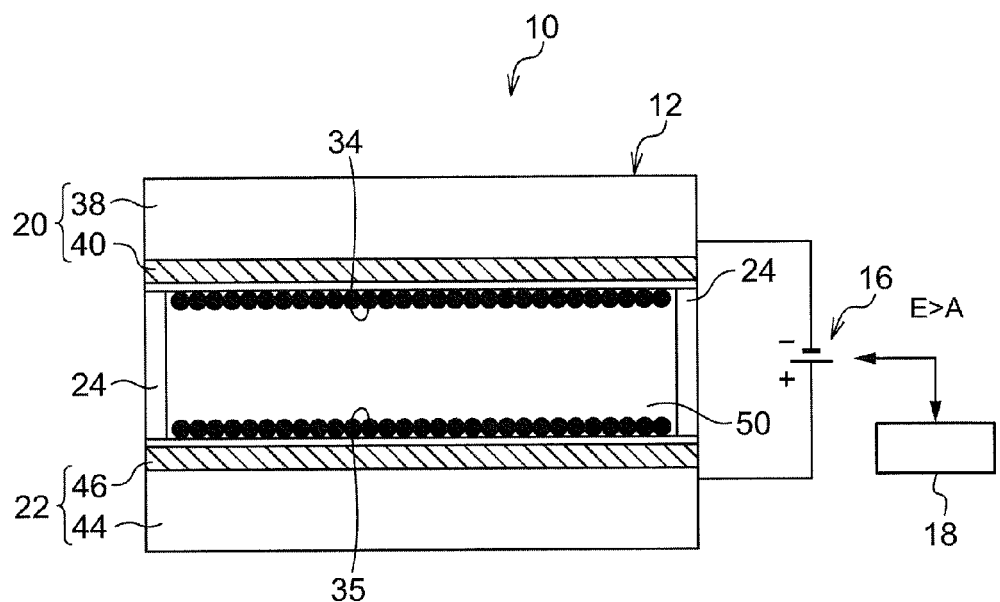

Subsequently, when a voltage that is greater than the threshold voltage A (V) of electrophoretic particles 35 (E>A) is applied between front electrode 40 and rear electrode 46, as shown in FIG. 3C, electrophoretic particles 35 move to the side of rear electrode 46 while electrophoretic particle 34 remain at the side of front electrode 40. At this time, electrophoretic particles 35 that are about to move from front electrode 40 become unbound, but are bound again when electrophoretic particles 35 reach the side of rear electrode 46. The color observed from the side of display electrode 40 is the color of electrophoretic particles 34.

Figure 3D:
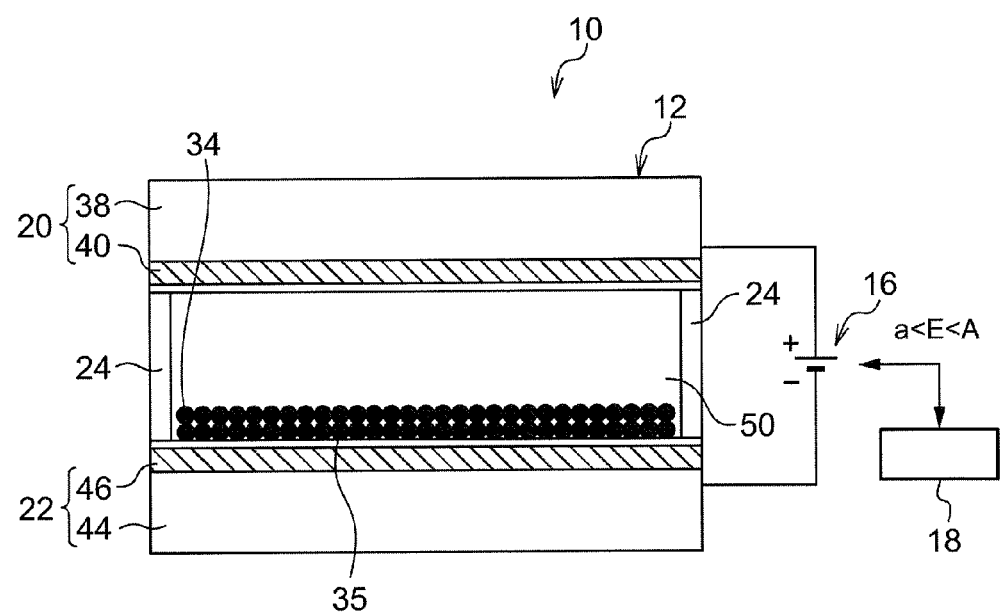

Subsequently, when a voltage of the opposite polarity that is greater than the threshold voltage of electrophoretic particles 34: a (V) but smaller than the threshold voltage of electrophoretic particles 35: A (V) (a<E<A) is applied between front electrode 40 and rear electrode 46, as shown in FIG. 3D, electrophoretic particles 35 remain at the side of rear electrode 46 while electrophoretic particles 40 move to the side of rear electrode 46. At this time, electrophoretic particles 34 that are about to move from display electrode 40 become unbound, but are bound again when electrophoretic particles 34 reach the side of rear substrate 46. The color of neither electrophoretic particles 34 nor electrophoretic particles 35 is observed from the side of front electrode 40.

<Behavior of Electrophoretic Particles of Two Kinds (Two Colors) Upon Application of a Triangle Wave>

The following are explanation of the behavior of electrophoretic particles of two kinds (positively charged electrophoretic particles and negatively charged electrophoretic particles) upon application of a triangle wave in the display medium according to this exemplary embodiment, when including two kinds of electrophoretic particles having different colors and charge polarities, with reference to FIGS. 4A to 4I.

Each cell of this display medium contains the electrophoretic particle dispersion according to this exemplary embodiment. Therefore, each cell contains a dispersing medium, in which magenta electrophoretic particles 1M (negatively charged), cyan electrophoretic particles 1C (positively charged) and a crosslinking agent (not shown) are dispersed. Electrophoretic particles 1M and 1C include external particles formed from the same material, and the electrophoretic particle dispersion contains only one kind of crosslinking agent. Further, electrophoretic particles 1C are covered with external particles having a greater average diameter than that of the external particles that cover the surface of electrophoretic particles 1M. Therefore, the value of threshold voltage of electrophoretic particles 1C is adjusted so as to be greater than that of electrophoretic particles 1M. In the following, the voltage applied between front electrode 8A and rear electrode 8B is determined as V (V), the threshold voltage of electrophoretic particles 1M is determined as V1 (V), and the threshold voltage of electrophoretic particles 1C is determined as V1 (V) (V1 >V1 ).

Figure 4A:
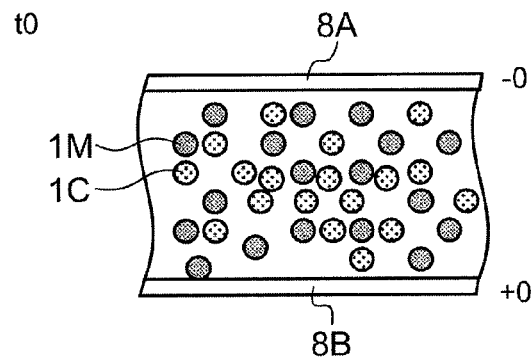
FIGS. 4A to 4I are schematic views showing the behavior of electrophoretic particles in the display medium that contains the electrophoretic particle dispersion according to an aspect of the invention, wherein the dispersion includes two kinds of electrophoretic particles.
Figure 5:
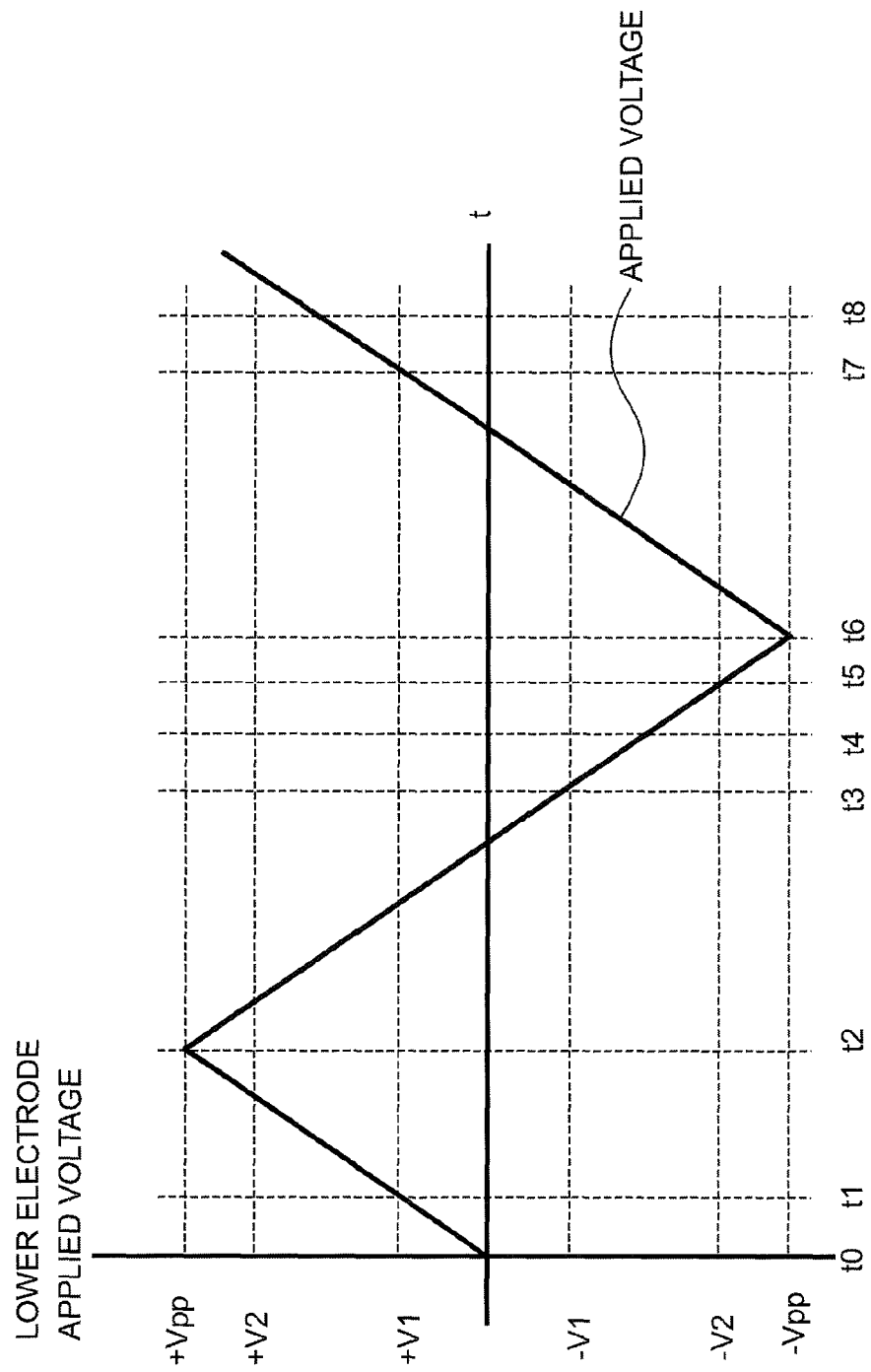
FIG. 5 is a graph showing the values of voltage (triangle wave) applied at each state of FIGS. 4A to 4I.

As shown in FIG. 5, when the triangle wave is at the state of 10, i.e., when no voltage is applied to electrodes 8A and 8B, electrophoretic particles 1M and electrophoretic particles 1C are dispersed in the dispersing medium, as shown in FIG. 4A. At this time, the electrophoretic particles are not bound to each other by the crosslinking agent.

Figure 4B:
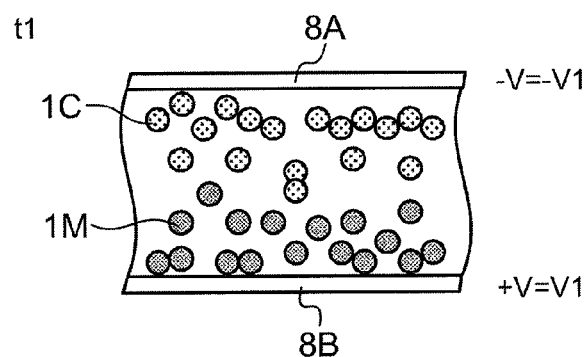

Next, when the triangle wave is in the state of t1 in FIG. 5, i.e., a voltage is applied such that front electrode 8A is a negative electrode and rear electrode 8B is a positive electrode, as shown in FIG. 4B, electrophoretic particles 1M start to move to the side of rear electrode 8B, while electrophoretic particles 1C start to move to the side of front electrode 8A.

Figure 4C:
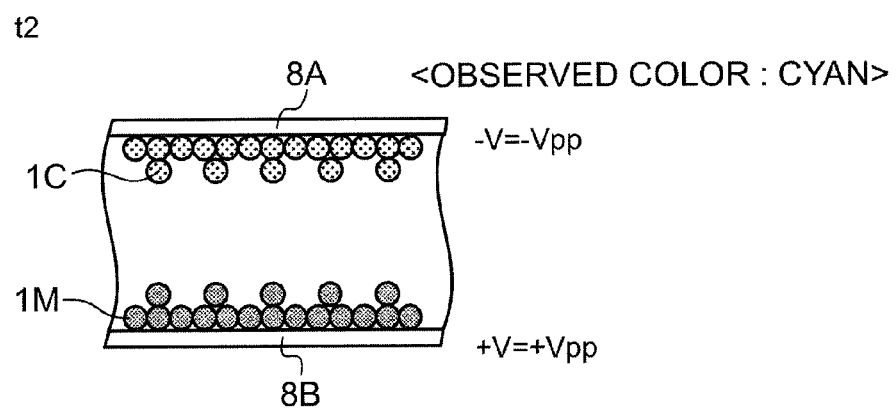

Thereafter, when the triangle wave is in the state of t2 in FIG. 5, i.e., electrophoretic particles 1M are positioned at the side of rear electrode 8B while electrophoretic particles 1C are positioned at the side of front electrode 8A, as shown in FIG. 4C, electrophoretic particles 1M and 1C are in a bound state by the crosslinking agent, respectively. At this time, the cyan color of electrophoretic particles 1C is observed from the side of front electrode 8A.

Figure 4D:
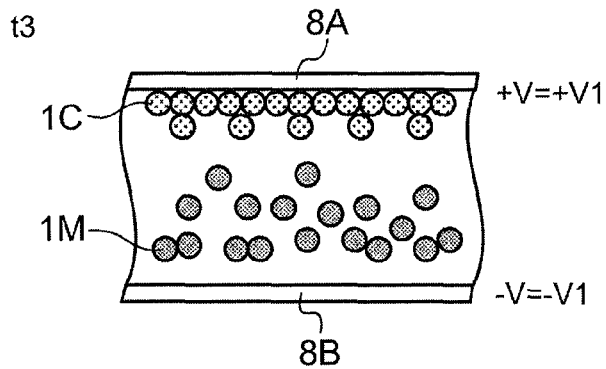

Subsequently, when the triangle wave is in the state of t3 in FIG. 5, i.e., a voltage of the opposite polarity having the value of threshold voltage of electrophoretic particles 1M: V1 (V) is applied between front electrode 8A and rear electrode 8B, electrophoretic particles 1M start to move from rear electrode 8B, as shown in FIG. 4D. At this time, electrophoretic particles 1M that are about to move from rear electrode 8B become unbound.

Figure 4E:
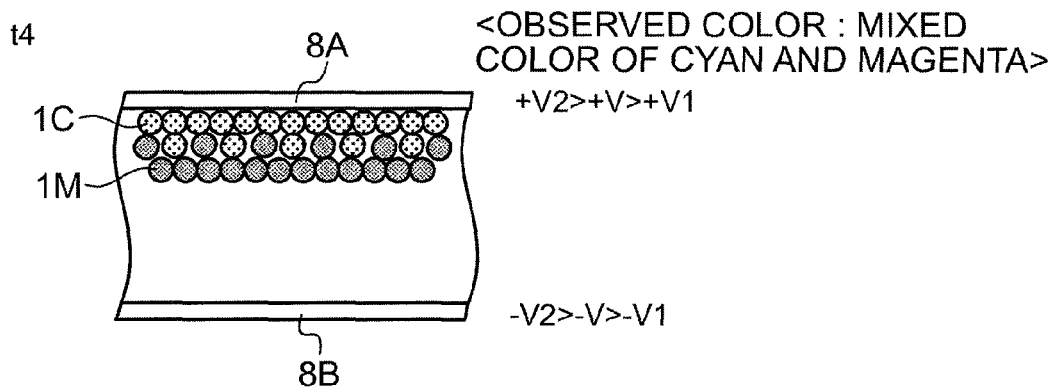

Thereafter, when the triangle wave is in the state of t4 in FIG. 5, i.e., a voltage that is greater than the threshold voltage of electrophoretic particles 1M: V1 (V) but smaller than the threshold voltage of electrophoretic particles 1C: V1 (V) (V1 >V>V1) is applied, electrophoretic particles 1M move to the side of front electrode 8A, while electrophoretic particles 1C remain at the side of front electrode 8A, as shown in FIG. 4E. At this time, electrophoretic particles 1M that have moved to the side of front electrode 8A are bound again by the crosslinking agent. The color observed from the side of front electrode 8A is a mixed color of electrophoretic particles 1M and electrophoretic particles 1C.

Figure 4F:
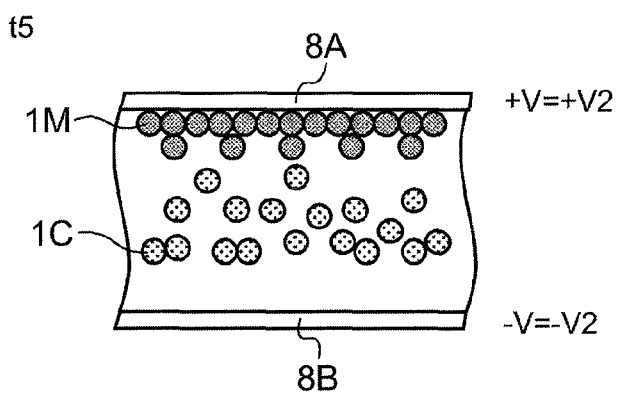

Subsequently, when the triangle wave is in the state of t5 in FIG. 5, i.e., a voltage of threshold voltage of electrophoretic particles 1C: V1 (V) is applied between front electrode 8A and rear electrode 8B, electrophoretic particles 1C start to move from front electrode 8A, as shown in FIG. 4F. At this time, electrophoretic particles 1C that are about to move from front electrode 8A become unbound.

Figure 4G:
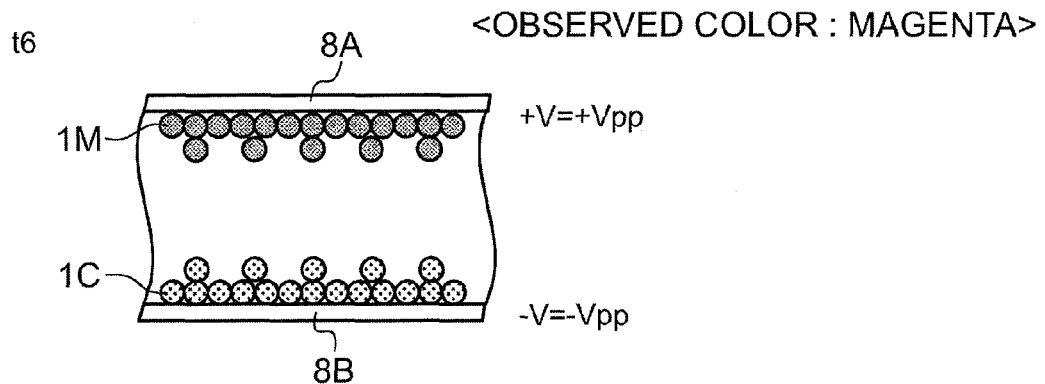

Thereafter, when the triangle wave is in the state of t6 in FIG. 5, i.e., a voltage that is greater than the threshold voltage of electrophoretic particles 1M: V1 (V) and greater than the threshold voltage of electrophoretic particles 1C: V1 (V) (V=Vpp) is applied to the electrodes, electrophoretic particles 1C move to the side of rear electrode 8B while electrophoretic particles 1M remain at the side of front electrode 8A, as shown in FIG. 4G. At this time, electrophoretic particles 1C that are positioned at the side of rear electrode 8B are bound to each other again by the crosslinking agent. The color observed from the side of front electrode 8A is the magenta color of electrophoretic particles 1M.

Figure 4H:
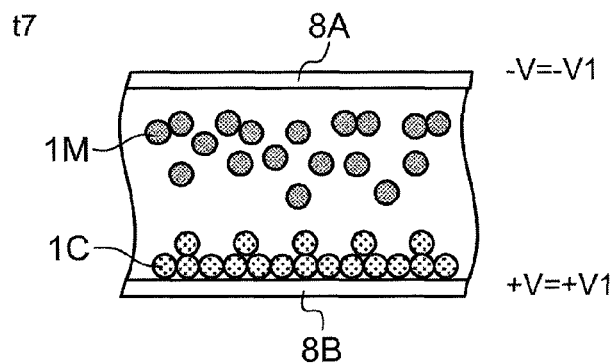

Further, when the triangle wave is in the state of t7 in FIG. 5, i.e., a voltage of the opposite polarity having the value of threshold voltage of electrophoretic particles 1M: V1 (V) is applied between front electrode 8A and rear electrode 8B, electrophoretic particles 1M start to move from front electrode 8A, as shown in FIG. 4H. At this time, electrophoretic particles 1M that are about to move from front electrode 8A become unbound.

Figure 4I:
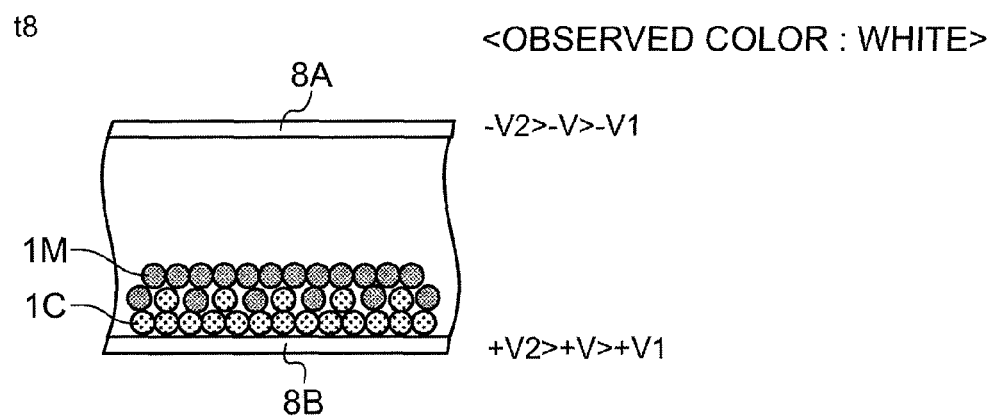

Thereafter, when the triangle wave is in the state of t8 in FIG. 5, i.e., a voltage that is greater than the threshold voltage of electrophoretic particles 1M: V1 (V) but smaller than the threshold voltage of electrophoretic particles 1C: V1 (V) (V1 >V>V1) is applied to the electrodes, as shown in FIG. 4I, electrophoretic particles 1M move to the side of rear electrode 8B while electrophoretic particles 1C remain at the side of rear electrode 8B. Electrophoretic particles 1M that are positioned at the side of rear electrode 8B are bound again by the crosslinking agent. Further, the color of neither electrophoretic particles 1M nor 1C is observed from the side of front electrode 8A.

In the following, details of the composition of each material of the electrophoretic particle dispersion according to this exemplary embodiment are described.

Electrophoretic Particles (Mother Particles)

The electrophoretic particles according to this exemplary embodiment are, as mentioned above, formed from mother particles having the surface thereof covered with external particles. The mother particles according to this exemplary embodiment are particles that have a color that can be visually observed, and are charged so as to move in accordance with an externally applied electric field.

Exemplary materials for the mother particles include glass beads, metal oxide particles having an insulating property such as alumina or titanium oxide, thermoplastic or thermosetting resin particles, resin particles with a colorant fixed to the surface thereof, and metal colloid particles having a plasmon color development function.

Exemplary thermoplastic resins that can be used for the mother particles include homopolymers or copolymers of styrenes such as styrene and chlorostyrene, monoolefins such as ethylene, propylene, butylene and isoprene, vinyl esters such as vinyl acetate, vinyl propionate, vinyl benzoate and vinyl butyrate, α-methylene aliphatic monocarboxylates such as methyl acrylate, ethyl acrylate, butyl acrylate, dodecyl acrylate, octyl acrylate, phenyl acrylate, methyl methacrylate, ethyl methacrylate, butyl methacrylate and dodecyl methacrylate, vinyl ethers such as vinyl methyl ether, vinyl ethyl ether and vinyl butyl ether, vinyl ketones such as vinyl methyl ketone, vinyl hexyl ketone and vinyl isopropenyl ketone.

Exemplary thermosetting resins that can be used for producing the mother particles include a crosslinked copolymer including divinyl benzene as a main component, a crosslinked resin such as crosslinked polymethyl methacrylate, phenol resin, urea resin, melamine resin, polyester resin, and silicone resin. Among these, particularly typical resins include polystyrene, styrene-alkyl acrylate copolymer, styrene-alkyl methacrylate copolymer, styrene-acrylonitrile copolymer, styrene-butadiene copolymer, styrene-maleic anhydride copolymer, polyethylene, polypropylene, polyester, polyurethane, epoxy resin, silicone resin, polyamide, modified rosin, and paraffin wax.

Exemplary colorants for the mother particles include organic or inorganic pigments and oil-soluble dyes, such as magnetic powders of magnetite, ferrite and the like, carbon black, titanium oxide, magnesium oxide, zinc oxide, phthalocyanine copper-based cyan colorant, azo-based yellow colorant, azo-based magenta colorant, quinacridone-based magenta colorant, red colorant, green colorant, and blue colorant. Specific examples of the colorant include aniline blue, Calco Oil blue, chrome yellow, ultramarine blue, DuPont Oil red, quinoline yellow, methylene blue chloride, phthalocyanine blue, malachite green oxalate, lamp black, rose bengal, C. I. Pigment Red 48:1, C. I. Pigment Red 122, C. I. Pigment Red 57:1, C. I. Pigment Yellow 97, C. I. Pigment Blue 15:1, and C. I. Pigment Blue 15:3.

The mother particles may include a charge control agent in the resin that forms the mother particles. Exemplary charge control agents include known ones for use in electrophotographic toner materials, such as cetylpyridyl chloride, BONTRON P-51, BONTRON P-53, BONTRON E-84 and BONTRON E-81 (trade name, manufactured by Orient Chemical Industries, Co., Ltd.), salicylic acid-based metal complexes, phenol-based condensates, tetraphenyl-based compounds, metal oxide particles, and metal oxide particles having the surface thereof treated with a coupling agent of various kinds.

A magnetic material may be mixed in the mother particles. Examples of the magnetic material include an inorganic or organic magnetic material that may have a color coating. Transparent magnetic materials, particularly transparent organic materials, are particularly preferred.

The average particle diameter of the mother particles is preferably from 0.1 μm to 10 μm, but the invention is not limited thereto.

The average particle diameter of the mother particles described in the present specification is measured by using a dynamic light-scattering particle size distribution measurement device (PHOTAL FPAR 1000, trade name, manufactured by Otsuka Electronics, Co., Ltd.) and analyzed by a Marquardt method. The average particle diameters described in the present specification are measured using this method.

The curvature of the mother particles is expressed by an inverse number of the radius of the mother particles. Specifically, when the average particle diameter of the mother particles as measured by the above method is given as d, the curvature of the mother particles can be expressed as (2/d).

The method of producing the mother particles may be selected from known methods. For example, as described in Japanese Patent Application Laid-Open No. 7-325434, the mother particles may be produced by measuring the raw materials such as a resin or a pigment so as to satisfy a certain mixture ratio, heating and melting the resin and adding the pigment to the resin, mixing and dispersing the same and cooling, preparing particles using a pulverizer such as a jet mill, a hammer mill or a turbo mill, and then dispersing the obtained particles in a dispersing medium. Alternatively, a particle dispersing medium may be produced by preparing particles by a polymerization method such as suspension-polymerization, emulsification-polymerization or dispersion-polymerization, a coacervation method, a melt-dispersion method, an emulsion-aggregation method, or the like, and then dispersing the obtained particles in a dispersing medium. Further examples include a method of using a suitable machine that performs dispersion, mixing and kneading of the raw materials such as a rein, a colorant and a dispersing medium, such that the resin can plasticize but the dispersing medium does not boil, at a temperature lower than the decomposition point of at least one of the resin and the colorant. Specifically, this method can be carried out by heating and melting the pigment and the resin in the dispersing medium using a planetary mixer, a kneader or the like, and cooling the molten mixture while stirring to allow the mixture to solidify and precipitate to form the particles, by utilizing the temperature dependency of the solvent-solubility of the resin.

Another applicable method of producing the mother particles includes placing the aforementioned raw materials in a suitable container equipped with granular media for dispersing and kneading, for example, a heated vibrating mill such as an attritor or a heated ball mill, and performing the dispersion and the kneading in a suitable temperature range, such as from 80 to 160° C. Preferred materials for the granular media include steels such as stainless steel or carbon steel, alumina, zirconia and silica. In order to produce the mother particles in this method, the raw materials that are previously made into a fluid state are further dispersed in the container using the granular media, and the resin including the colorant is allowed to precipitate from the dispersing medium by cooling the dispersing medium. The granular media are kept in motion during and after the cooling, and the size of the particles is reduced by the application of a shear force and/or an impact generated by the granular media.

(External Particles)

In the electrophoretic particles according to this exemplary embodiment, the surface of the mother particles is covered with the external particles. The color of the external particles is preferably transparent so as not to affect the color of the mother particles.

Examples of the external particles include inorganic particles of metal oxide such as silicon oxide (silica), titanium oxide or alumina, and polymer particles of polystyrene, polymethyl methacrylate, melamine-formaldehyde condensate or the like. Among these, silicon carbide (silica) is particularly preferred. The surface of these particles may be treated with a coupling agent, silicone oil or the like.

Examples of the coupling agent include positively-charged coupling agents such as aminosilane-based coupling agents, aminotitanium-based coupling agents and nitrile-based coupling agent, and negatively-charged coupling agents such as nitrogen-free (not including a nitrogen atom) silane-based coupling agents, titanium-based coupling agents, epoxysilane-based coupling agents, and acrylsilane-based coupling agents. Examples of the silicone oil include positively-charged silicone oils such as amino-modified silicone oil, and negatively-charged silicone oils such as dimethyl silicone oil, alkyl-modified silicone oil, α-methyl sulfone-modified silicone oil, methyl phenyl silicone oil, chlorophenyl silicone oil, and fluorine-modified silicone oil. These silicone coupling agents or silicone oils may be selected as appropriate according to the resistance of the external particles.

Among these external particles, hydrophobic silica or hydrophobic titania, which are commonly known materials, are preferred. In particular, a titanium compound obtained by reacting $TiO(OH)_2$ with a silane compound such as a silane coupling agent, as described in Japanese Patent Application Laid-Open No. 10-3177, is preferred. The silane compound may be selected from chlorosilane, alkoxysilane, silazane and special silyl compounds. This titanium compound can be produced by a wet method in which $TiO(OH)_2$ is allowed to react with a silane compound or silicone oil, and then dried.

The average particle diameter of primary particles of the external particles is typically from 1 nm to 100 nm, preferably from 5 nm to 50 nm, but the present invention is not limited thereto.

Further, the average particle diameter of the external particles including the primary particles and the aggregated state thereof is preferably from 0.007 μm to 0.5 μm, but the present invention is not limited thereto.

The average particle size and the curvature of the external particles can be measured by the same method for measuring the average particle size and the curvature of the mother particles as mentioned above. The values as described in the present specification are measured by this method.

As mentioned above, the curvature-adjustment material that forms the curvature-adjustment portion according to this exemplary embodiment may be in the form of particles that are added as external particles as described above, or in the form of a film having irregularities on the surface thereof.

Crosslinking Agent

The electrophoretic particle dispersion according to this exemplary embodiment includes a crosslinking agent.

Examples of the crosslinking agent include a copolymer that is soluble in an insulating liquid and is formed from a monomer having a functional group capable of adsorbing to the external particles, such as an acidic group, a basic group, a hydroxyl group or a phenyl group, and a further monomer.

Examples of the monomer having an acidic group include anionic monomers such as carboxylic acid monomers, sulfonic acid monomers and phosphoric acid monomers.

Examples of the carboxylic acid monomer include (meth) acrylic acid, crotonic acid, itaconic acid, maleic acid, fumaric acid, citraconic acid, anhydrides and monoalkyl esters of these monomers, and vinyl ethers having a carboxyl group such as carboxyethylvinyl ether and carboxypropylvinyl ether.

Examples of the sulfonic acid monomer include styrene sulfonic acid, 2-acrylamide-2-methylpropane sulfonic acid, 3-sulfopropyl(meth)acrylic acid ester, bis-(3-sulfopropyl)-itaconid acid ester, and a salt of these monomers. Further examples include sulfuric acid monoesters or a salt of 2-hydroxyethyl(meth)acrylic acid.

Examples of the phosphoric acid monomer include vinyl phosphoric acid, vinyl phosphate, acid phosphoxyethyl (meth)acrylate, acid phosphoxy propyl(meth)acrylate, bis (methacryloxyethyl) phosphate, diphenyl-2-methacryloyloxyethyl phosphate, diphenyl-2-acryloyloxyethyl phosphate, dibutyl-2-methacryloyloxyethyl phosphate, dibutyl-2-acryloyloxyethyl phosphate, and dioctyl-2-(meth) acryloyloxyethyl phosphate.

Preferred anionic monomers include those having a (meth) acrylic acid or a sulfonic acid, more preferably those having a structure of ammonium salt before or after the polymerization. The ammonium salt may be produced by allowing an anionic monomer with a tertiary amine or a quaternary ammonium hydroxide.

Examples of the monomer having a basic group include the following cationic monomers: (meth)acrylates having an aliphatic amino group, such as N,N-dimethylaminoethyl (meth) acrylate, N,N-diethylaminoethyl(meth)acrylate, N,N-dibutylaminoethyl (meth)acrylate, N,N-hydroxyethylaminoethyl (meth)acrylate, N-ethylamino ethyl(meth)acrylate, N-octyl-N-ethylaminoethyl(meth)acrylate, and N,N-dihexylaminoethyl (meth)acrylate; aromatic-substituted ethylene monomers having a nitrogen-containing group, such as dimethylaminostyrene, diethylaminostyrene, dimethylaminomethylstyrene and dioctylaminostyrene; nitrogen-containing vinyl ether monomers, such as vinyl-N-ethyl-N-phenylaminoethyl ether, vinyl-N-butyl-N-phenylaminoethyl ether, triethanolamine divinyl ether, vinyl diphenyl aminoethyl ether, N-vinyl hydroxyethyl benzamide, and m-aminophenyl vinyl ether; vinylamine; pyrroles such as N-vinyl pyrrole; pyrrolines such as N-vinyl-2-pyrroline and N-vinyl-3-pyrroline; pyrrolidines such as N-vinyl pyrrolidine, vinylpyrrolidine amino ether, and N-vinyl-2-pyrrolidone; imidazoles such as N-vinyl-2-methyl imidazole; imidazolines such as N-vinyl imidazoline, indoles such as N-vinyl indole, indolines such as N-vinyl indoline, carbazoles such as N-vinyl carbazole and 3,6-dibromo-N-vinyl carbazole, pyridines such as 2-vinyl pyridine, 4-vinyl pyridine and 2-methyl-5-vinyl pyridine, piperidines such as (meth)acrylic piperidine, N-vinyl piperidone and N-vinyl piperadine, quinolines such as 2-vinyl quinoline and 4-vinyl quinoline, pyrazoles such as N-vinyl pyrazole and N-vinyl pyrazoline, oxazoles such as 2-vinyl oxazole, and oxazines such as 4-vinyl oxazine and morpholinoethyl (meth)acrylate.

Among these, preferred cationic monomers are (meth) acrylates having an aliphatic amino group such as N,N-dimethylaminoethyl(meth)acrylate and N,N-diethylaminoethyl (meth)acrylate, and these monomers are particularly preferably used in the form of a quaternary ammonium salt before or after the polymerization. The cationic monomer can be formed into a quaternary ammonium salt by allowing the same to react with an alkyl halide or a tosyl ester.

Examples of the monomer having a hydroxyl group include those obtained by copolymerizing monomers having a glycidyl group and then allowing to open the ring; or polymerizing a monomer having a t-butoxy group or the like and then introducing an OH group by performing hydrolysis, such as hydroxyethyl acrylate, hydroxyethyl(meth)acrylate, hydroxypropyl acrylate, hydroxypropyl(meth)acrylate and allyl alcohol.

Examples of the monomer having a phenyl group include styrene, phenoxyethylene glycol acrylate, phenoxypolyethylene glycol acrylate, 2-hydroxy-3-phenoxypropyl acrylate, and phenoxyethylene glycol methacrylate.

Other examples of the monomer include nonionic monomers such as (meth)acrylonitrile, alkyl(meth)acrylate, (meth) acrylamide, ethylene, propylene, butadiene, isoprene, isobutylene, N-dialkyl-substituted (meth)acrylamide, styrene, vinyl carbazole, styrene derivatives, polyethylene glycol mono(meth)acrylate, vinyl chloride, vinylidene chloride, isoprene, butadiene, vinyl pyrrolidone, hydroxyethyl(meth) acrylate, hydroxybutyl (meth)acrylate, and alkyl(meth)acrylate having an alkyl chain including 1 to 30 carbon atoms.

When the insulating liquid is silicone oil, a macromonomer having a dimethyl silicone chain as a side chain component is suitably used. Therefore, the crosslinking agent may be a copolymer of the aforementioned monomer and a macromonomer having a dimethyl silicone chain. Examples of the macromonomer having a dimethyl silicone chain include SILAPLANE FM-0711, FM-0721, FM-0725 and FM-0701 (trade name, manufactured by Chisso Corporation); X-22-174DX, X-22-2426 and X-22-2475 (trade name, manufactured by Shin-Etsu Chemical Co., Ltd.)

Among these, the following combinations of the external particles and the crosslinking agent are preferred.

| External Particles | Crosslinking Agent |
|---|---|
| Silicone oxide (silica) | Crosslinking agent having an acidic group |
| Silicone oxide (silica) | Crosslinking agent having a basic group |
| Silicone oxide (silica) | Crosslinking agent having a hydroxyl group |
| Silicone oxide (silica) | Crosslinking agent having a phenyl group |

The method of producing the aforementioned crosslinking agent may be a known method of polymerizing a polymer compound. For example, the crosslinking agent may be produced by synthesizing a mixture of monomers of the components combined at a certain ratio, in a polymerization solvent, by a radical solution polymerization.

The amount of the crosslinking agent is preferably from $10^{-7}$% by weight to 1% by weight, with respect to the amount of electrophoretic particles.

Dispersing Medium

Subsequently, the dispersing medium used in the electrophoretic particle dispersion according to this exemplary embodiment is described. In this specification, being "insulating" refers to having a volume resistivity of $10^{11}$ Ωcm throughout the description.

Specific examples of the insulating liquid include hexane, cyclohexane, toluene, xylene, decane, hexadecane, kerosine, paraffin, isoparaffin, silicone oil, dichloroethylene, trichloroethylene, perchloroethylene, high-purity petroleum oil, ethylene glycol, alcohols, ethers, esters, dimethylformamide, dimethylacetoamide, dimethylsulfoxide, N-methylpyrrolidone, 2-pyrrolidone, N-methylformamide, acetonitrile, tetrahydrofuran, propylene carbonate, ethylene carbonate, benzene, diisopropylnaphthalene, olive oil, isopropanol, trichlorotrifluoroethane, tetrachloroethane, dibromotetraluoroethane, or a mixture thereof. Among these, silicone oil is suitably used.

Water (pure water) may also be suitably used as the insulating liquid by removing impurities in order to adjust the volume resistivity thereof within the following range. The volume resistivity is preferably $10^3$ Ωcm or more, more preferably from $10^7$ Ωcm to $10^{19}$ Ωcm, and further preferably from $10^{10}$ Ωcm to $10^{19}$ Ωcm.

Additives such as acid, alkali, salt, dispersion stabilizers, stabilizers for inhibiting oxidization or absorbing UV rays, antibacterial agents, antiseptic agents, and the like may be added to the insulating liquid, preferably such that the volume resistivity of the insulating liquid is within a range as mentioned above.

Further, the insulating liquid may include, as a charge controlling agent, an anionic surfactant, a cationic surfactant, an amphoteric surfactant, a nonionic surfactant, a fluorine-based surfactant, a silicone-based surfactant, metal soap, alkyl phosphates, succinimides, or the like.

Specific examples of the nonionic surfactant include polyoxyethylene nonylphenyl ether, polyoxyethylene octylphenyl ether, polyoxyethylene dodecylphenyl ether, polyoxyethylene alkyl ether, polyoxyethylene fatty acid ester, sorbitan fatty acid ester, polyoxyethylene sorbitan fatty acid ester, and fatty acid alkylol amide.

Specific examples of the anionic surfactant include alkylbenzene sulfonate, alkylphenyl sulfonate, alkyl naphthalene sulfonate, higher fatty acid salt, sulfates of higher fatty acid ester, and sulfonates of higher fatty acid ester.

Specific examples of the cationic surfactant include primary to tertiary amine salts and quaternary ammonium salts.

When the charge control agent is used, the amount thereof is preferably from 0.01% by weight to 20% by weight with respect to the total solid content of the particles.

A high-molecular resin may be used as the dispersing medium in combination with the insulating liquid. Suitable examples of the high-molecular resin include a high-molecular gel and a high-molecular polymer.

Examples of the high-molecular resin include natural high-molecular gels such as agarose, agaropectin, amylose, sodium alginate, propylene glycol alginate, isolichenan, insulin, ethyl cellulose, ethylhydroxy ethyl cellulose, curdlan, casein, carrageenan, carboxymethyl cellulose, carboxymethyl starch, callose, agar, chitin, chitosan, silk fibroin, guar gum, quince seed, crown-gall polysaccharide, glycogen, glucomannan, keratan sulfate, keratin protein, collagen, cellulose acetate, gellan gum, schizophyllan, gelatin, ivory palm mannan, tunicin, dextran, dermatan sulfate, starch, tragacanth gum, nigeran, hyaluronic acid, hydroxyethyl cellulose, hydroxypropyl cellulose, pusturan, funoran, decomposed xyloglucan, pectin, porphyran, methyl cellulose, methyl starch, laminaran, lichenan, lentinan, and locust beam gum; and most kinds of synthetic high-molecular gels.

Further examples include polymers having a functional group of alcohol, ketone, ether, ester or amide in the repeating unit thereof, such as polyvinyl alcohol, poly(meth)acrylamide or a derivative thereof, polyvinyl pyrrolidone, polyethylene oxide, and a copolymer including the polymer as mentioned above.

Among these, gelatin, polyvinyl alcohol and poly(meth) acrylamide are suitably used.

A colorant may be mixed in the dispersing medium so that the display medium displays a different color than that of the electrophoretic particles.

Examples of the colorant include carbon black, titanium oxide, magnesium oxide, zinc oxide, phthalocyanine copper-based cyan colorant, azo-based yellow colorant, azo-based magenta colorant, quinacridone-based magenta colorant, red colorant, green colorant, and blue colorant. Specific examples of the colorant include aniline blue, Calco Oil blue, chrome yellow, ultramarine blue, DuPont Oil red, quinoline yellow, methylene blue chloride, phthalocyanine blue, malachite green oxalate, lamp black, rose bengal, C. I. Pigment Red 48:1, C. I. Pigment Red 122, C. I. Pigment Red 57:1, C. I. Pigment Yellow 97, C. I. Pigment Blue 15:1, and C. I. Pigment Blue 15:3.

Color suspended particles may be dispersed in the dispersing medium. The color suspended particles are uncharged color particles that have a different optical reflection property than that of the electrophoretic particles, and function as a reflective member that displays a different color than that of the electrophoretic particles. The color suspended particles also function as a spacer that allows the electrophoretic particles to move between the display substrate and the rear substrate without inhibiting the movement of the electrophoretic particles.

Color suspended particles may be produced by, for example, dispersing a white pigment such as titanium oxide, silicon oxide or zinc oxide in a resin such as polystyrene, polyethylene, polypropylene, polycarbonate, PMMA, acrylic resin, phenol resin, and formaldehyde condensate resin. Color suspended particles may have a color other than white, and resin particles including the aforementioned pigment or dye having an intended color may be used. When a color of RGB or YMC is desired, pigments or dyes that are typically used in printing inks or color toners are applicable.

The color suspended particles may be enclosed in a space between the substrates by, for example, an inkjet method. If desired, the color suspended particles may be fixed while maintaining spaces among the particles, by melting the surface of color suspended particles by applying heat (and pressure, if necessary) after enclosing the color suspended particles.

Since the electrophoretic particles move in the dispersing medium, the viscosity thereof may be adjusted, for example, to a range of from 0.1 mPa·s to 100 mPa·s at 20° C. The viscosity of the dispersing medium can be adjusted by changing the molecular weight, structure, or composition of the dispersing medium. The measurement of the viscosity can be conducted using a viscometer, for example, B-8L, trade name, manufactured by Tokyo Keiki Inc.)

<Display Medium/Display Device>

The display medium according to this exemplary embodiment includes a pair of substrate, at least one of the substrates being transparent, and the electrophoretic particle dispersion positioned between the pair of substrates.

The display device according to this exemplary embodiment includes a pair of substrate, at least one of the substrates being transparent, the electrophoretic particle dispersion positioned between the pair of substrates, and a voltage application unit that applies a voltage to the pair of substrates.

In the following, components of the display medium and the display device according to this exemplary embodiment other than the electrophoretic particle dispersion are described.

Substrate

At least one of the pair of substrate is transparent and positioned at the display side, so that an image can be visually observed from the display side. In this exemplary embodiment, being transparent refers to having a transmittance with respect to visible light of 60% or more.

Materials for the substrate include glass, plastics such as polyethylene terephthalate resin, polycarbonate resin, acrylic resin, polyimide resin, polyester resin, epoxy resin, and polyether sulfone resin.

An electrode is provided to each of the substrates. Materials for the electrode include oxides of indium, tin, cadomium, antimony or the like, composite oxides such as ITO, metals such as gold, silver, copper, nickel or the like, and organic materials such as polypyrrole or polythiophene. These materials may be used to form a single layer, a mixed layer or a composite film, and the method of forming the electrode from these materials include an evaporation method, a sputtering method, an application method, or the like. When the electrode is formed by evaporation or sputtering, the thickness thereof is typically from 100 to 200 angstroms. Alternatively, the electrode may be formed by performing a known process such as etching used in conventional liquid crystal display media or print substrates, in the form of matrices or stripes that enable passive matrix driving. The electrode may be embedded in the substrate.

It is also possible to provide the electrode outside the display medium, separately from each of the substrates.

The electrode may be provided to both of the substrates, or to either one of the substrate so as to drive the display medium in an active matrix system.

In order to drive the display medium in an active matrix system, each pixel of the substrate may be provided with a TFT (thin film transistors).

Spacers

Spacers that maintain a space between the pair of substrates (for example, spacer 24 shown in FIGS. 3A to 3D) may be formed from thermoplastic resin, thermosetting resin, electron-curable resin, photo-curable resin, rubber, metal or the like, so that the transparency of the substrate is not impaired.

The spacers may be formed in an integrated manner with one of the pair of substrates by subjecting the substrate to an etching treatment, a laser treatment, or a pressing or printing treatment using a previously prepared mold. In this case, the spacers may be formed on one or both of the substrates.

The spacers may have a color or colorless, but are preferably colorless and transparent so that the display of an image on the display medium is not impaired. In this case, the spacers may be formed from a transparent resin such as polystyrene resin, polyester resin or acrylic resin.

The spacers in the form of particles are also preferably transparent, and the materials thereof include transparent resin particles of polystyrene, polyester or acrylic resin, and glass particles.

As mentioned above, being transparent refers to having a transmittance with respect to visible light of 60% or more.

Display Medium

The size of the cell used in the display medium has a close relationship with the fineness of the image displayed on the display medium. The smaller the cell is, the higher the fineness of the image displayed on the display medium is. The size of the cell in a planar direction of the substrate is typically from 10 μm to 1 mm.

The substrates are fixed to each other via the spacer by using a fixing means such as a combination of bolts and nuts, clamps, clips, or a frame for fixing the substrates. Alternatively, the substrates may be fixed to each other using an adhesive, or subjecting the substrates to a hot-melting treatment or a supersonic treatment.

The display medium as prepared above are capable of storing or rewriting an image, and are applicable to, for example, information boards, circulation boards, electronic blackboards, circulars, billboards, blinking signals, electronic paper, electronic newspaper, electronic books, and document sheets that can be used both in copiers and printers.

As mentioned above, the display device according to this exemplary embodiment includes the display medium and a voltage application unit that applies a voltage to the display medium.

Voltage Application Unit and Control Unit

The voltage application unit (an example of the voltage application unit) is electrically connected to the substrates. In this exemplary embodiment, the voltage application unit is electrically connected to both of the substrates: however, the voltage application unit may be electrically connected to one of the substrates while the other is grounded.

The voltage application unit is connected to a control unit so that the voltage application unit can receive signals from the control unit.

The control unit in this exemplary embodiment may be a microcomputer that includes a CPU (computer processing unit) that controls the operation of the whole device, a RAM (random access memory) that temporarily stores data, and a ROM (read only memory) that stores data for controlling the whole device.

The voltage application unit is a unit that applies a voltage to the electrodes in accordance with the signals sent from the control unit.

EXAMPLES

In the following, the invention is explained in further detail with reference to the examples. However, the invention is not limited to these examples.

Example 1

-Preparation of Cyan Mother Particle Dispersion-

A continuous phase is prepared by dissolving 5 parts by weight of silicone-modified acrylic polymer (KP545, trade name, manufactured by Shin-Etsu Chemicals, Co., Ltd.) in 95 parts by weight of dimethyl silicone oil (KF-96-2CS, trade name, manufactured by Shin-Etsu Chemicals, Co., Ltd.) Subsequently, a dispersing phase is prepared by mixing 7 parts by weight of cationized polyvinyl alcohol (K-210, trade name, manufactured by Nippon Synthetic Chemicals Industry Co., Ltd.), 3 parts by weight of cyan pigment dispersion (pigment solid content: 3 parts by weight) and 63 parts by weight of water. 20 parts of the dispersing phase is added to 80 parts by weight of the continuous phase, and this mixture is subjected to emulsification for 10 minutes using an ultrasonic homogenizer (UH-6005, trade name, manufactured by SMT Co., Ltd.)

The obtained emulsion is placed in a recovery flask and moisture is removed therefrom by heating (65° C.) and reducing pressure while stirring. A dispersion of cyan mother particles containing a cyan pigment is thus obtained.

The electrophoretic particles in the obtained cyan mother particle dispersion are observed with an optical microscope. As a result, particles having a diameter of 1 mm or more are not observed, and an aggregated mass is confirmed. When observed using an SEM (scanning electron microscope FE-SEMS-5500, trade name, manufactured by Hitachi Ltd.), particles having a spherical shape are observed. When observed using a dynamic light-scattering particle size distribution measurement device (HORIBA LB-550, trade name, manufactured by Horiba, Ltd.) the average diameter of the electrophoretic particles is 330 nm and the curvature thereof is $6.06 \times 10^6$ $(m^{-1})$. Further, the cyan mother particle dispersion is enclosed in a space between the pair of electrode substrates and a direct voltage is applied thereto, and the direction in which the electrophoretic particles move is evaluated. As a result, the electrophoretic particles are positively charged.

-Coating by External Particles-

Silica particles (X-24-9404, trade name, average particle size: 50 nm, curvature: $40 \times 10^6$ $(m^{-1})$, manufactured by Shin-Etsu Chemicals, Co., Ltd.) are added to the cyan mother particle dispersion as prepared above, and this is thoroughly stirred. After allowing the particles to precipitate using a centrifugal separator, washing is performed by removing the supernatant liquid for several times, thereby obtaining electrophoretic particles. When observed using an SEM, it is confirmed that the surface of the electrophoretic particles is covered with silica particles.

-Preparation of Crosslinking Agent-

A copolymer is synthesized from a vinyl monomer having a polysiloxane (SILAPLANE FM-0711, trade name, manufactured by Chisso Corporation, number average molecular weight (Mn)=1,000) and methyl methacrylate at a molar ratio of 50/50, by a known radical solution polymerization method, using isopropyl alcohol as a polymerization solvent. The solvent is removed from the reaction solution after the polymerization, thereby obtaining a crosslinking agent.

To a dispersion in which 1 part by weight of electrophoretic particles formed from mother particles covered with external particles as mentioned above are dispersed, 0.001 parts by weight of the crosslinking agent are added and mixed by stirring. A cyan electrophoretic particle dispersion is thus obtained.

-Method of Measuring Threshold Voltage-

The voltage at which the obtained cyan electrophoretic particles start to move upon application of an electric field (voltage applied to the substrates) is measured. Specifically, transparent glass electrodes (1 cm×5 cm) are positioned to face each other via a spacer (thickness: 100 μm). The cyan electrophoretic particle dispersion is injected from the side of the electrodes. Then, a direct voltage is applied to the substrates to allow the electrophoretic particles to move toward the electrodes. At this time, the color of electrophoretic particles that have moved to the side of the electrodes is observed from the side portion of the transparent glass electrodes. Thereafter, a triangle wave (0.5 V/sec) is applied between the electrodes and the intensity thereof is measured from the side portion of the transparent glass electrodes, and the voltage at which the color starts to change is determined as the threshold voltage (voltage at which the particles start to move). The results are shown in Table 1.

Example 2

A cyan electrophoretic particle dispersion is prepared in accordance with the method described in Example 1, except that the external particles are changed to silica particles (X-24-9163A, trade name, manufactured by Shin-Etsu Chemicals, Co., Ltd, average particle size: 110 nm, curvature: $18.18 \times 10^6$ $(m^{-1})$). The threshold voltage is measured in accordance with the method described in Example 1. The results are shown in Table 1.

Comparative Example 1

A cyan electrophoretic particle dispersion is prepared in accordance with the method described in Example 1, except that the external particles are not added (i.e., the cyan mother particles are not covered with the external particles) and that the crosslinking agent is not added. The threshold voltage is measured in accordance with the method described in Example 1. The results are shown in Table 1.

Comparative Example 2

A cyan electrophoretic particle dispersion is prepared in accordance with the method described in Example 1, except that the external particles are not added (i.e., the cyan mother particles are not covered with the external particles). The threshold voltage is measured in accordance with the method described in Example 1. The results are shown in Table 1.

Comparative Example 3

A cyan electrophoretic particle dispersion is prepared in accordance with the method described in Example 1, except that the crosslinking agent is not added. The threshold voltage is measured in accordance with the method described in Example 1. The results are shown in Table 1.

Comparative Example 4

A cyan electrophoretic particle dispersion is prepared in accordance with the method described in Example 2, except that the crosslinking agent is not added. The threshold voltage is measured in accordance with the method described in Example 1. The results are shown in Table 1.

TABLE 1

|  | External particles | Crosslinking agent | Threshold voltage |
| --- | --- | --- | --- |
| Example 1 | Added (50 nm) | Added | 2.1 V |
| Example 2 | Added (110 nm) | Added | 5.3 V |
| Com. Example 1 | — | — | 0.2 V |
| Com. Example 2 | — | Added | 0.2 V |
| Com. Example 3 | Added (50 nm) | — | — |
| Com. Example 4 | Added (110 nm) | — | — |

Example 3

Including Two or More Kinds of Electrophoretic Particles

-Preparation of Magenta Particles (Particle Dispersion)-

A magenta mother particle dispersion is prepared in accordance with the method of preparing the cyan mother particle dispersion in Example 1, in which the dispersing phase is prepared by mixing 7 parts by weight of an acrylic resin (acid value: 50) as the resin, 3 parts by weight of magenta pigment dispersion (pigment solid content: 3 parts by weight) and 63 parts by weight of water. The average particle diameter of the obtained electrophoretic particles is 420 nm and the curvature is $4.76 \times 10^6$ $(m^{-1})$. This dispersion is enclosed in a space between the two electrode substrates, and the direction in which the electrophoretic particles move upon application of a direct voltage is evaluated. As a result, the electrophoretic particles are negatively charged.

-Coating by External Particles-

Silica particles (X-24-9163A, trade name, average particle size: 110 nm, curvature: $18.18 \times 10^6$ $(m^{-1})$, manufactured by Shin-Etsu Chemicals, Co., Ltd.) are added to the magenta mother particle dispersion as prepared above, and this mixture is thoroughly stirred. After allowing the particles to precipitate using a centrifugal separator, washing is performed by removing the supernatant liquid for several times, thereby obtaining the electrophoretic particles. When observed using an SEM, it is confirmed that the surface of the electrophoretic particles is covered with silica particles.

-Evaluation Method-

The cyan electrophoretic particle dispersion obtained in Example 1 and the magenta electrophoretic particle dispersion obtained in the above process are mixed so that the concentrations of these dispersions are the same, and 0.001% by weight of the crosslinking agent with respect to the electrophoretic particles is added in the mixed dispersion. White particles as prepared in accordance with the following process are further added to this mixed dispersion, and the threshold voltage of electrophoretic particles is measured in accordance with the method described in Example 1.

When a triangle wave is applied at an initial state of the mixed dispersion, the color observed changes in the order of cyan, blue (mixed color of cyan and magenta), magenta, and white. The reason why this phenomenon occurs is presumed to be because the cyan particles has a higher threshold voltage and the magenta particles has a lower threshold voltage, as shown in FIG. 4A to 4I and FIG. 5.

-Preparation of White Particles-

Preparation of Dispersion A

Dispersion A is prepared by mixing the following components and subjecting the same to pulverization for 20 hours, using a ball mill with zirconia beads having a diameter of 10 mm.

<Composition>

Cyclohexyl methacrylate: 53 parts by weight

Titanium oxide 1 (white pigment, primary particle diameter: 0.3 μm, TIPAQUE CR 63, trade name, manufactured by Ishihara Sangyo Kaisha, Ltd.): 45 parts by weight Cyclohexane: 5 parts by weight Preparation of Calcium Carbonate Dispersion B Calcium carbonate dispersion B is prepared by mixing the following components and subjecting the same to pulverization for 20 hours, using a ball mill with zirconia beads having a diameter of 10 mm.

<Composition>

Calcium carbonate: 40 parts by weight

Water: 60 parts by weight

Preparation of Mixed Solution C

Mixed solution C is prepared by mixing the following components and degassing the same using an ultrasonic degasifier for 10 minutes, and then stirring the same using an emulsifier.

<Composition>

2%-by-weight aqueous solution of Celogen (carboxymethyl cellulose, manufactured by Dai-ichi Kogyo Seiyaku Co., Ltd.): 4.3 parts by weight Calcium carbonate dispersion B: 8.5 parts by weight 20%-by-weight saline: 50 parts by weight 35 parts of dispersion A, 1 part by weight of divinyl benzene and 0.35 parts by weight of a polymerization initiator (AIBN, azobisisobutylonitrile) are thoroughly mixed, and this mixture is degassed using an ultrasonic degasifier for 10 minutes.

This mixture is added to mixed solution C and emulsified using an emulsifier. Subsequently, the obtained emulsion is placed in a bottle and sealed with a silicone cap, and decompression degassing is thoroughly performed using an injection needle. The mixture is allowed to react at 65° C. for 15 hours, thereby preparing particles. After cooling, the dispersion is placed in a freeze drier and allowed to stand at −35° C. and 0.1 Pa for two days in order to remove the cyclohexane therefrom. The obtained particle powder is dispersed in ion exchange water, and the calcium carbonate is allowed to decompose by adding hydrochloric acid water, and then filtered. Thereafter, the particles are washed with a sufficient amount of distilled water, the particle size thereof is regulated using nylon sieves of 20 μm and 25 μm in mesh size, and then dried. White particles having a volume average particle size of 20 μm are thus obtained.

All publications, patent applications, and technical standards mentioned in this specification are herein incorporated by reference to the same extent as if each individual publication, patent application, or technical standard was specifically and individually indicated to be incorporated by reference.

What is claimed is:

1. An electrophoretic particle dispersion comprising:
electrophoretic particles comprising first particles having a surface thereof covered with a curvature-adjustment portion formed from a curvature-adjustment material, a curvature at the surface of the curvature-adjustment portion being greater than the curvature of the first particles that do not comprise the curvature-adjustment portion;
a crosslinking agent capable of binding the electrophoretic particles via a reversible crosslinked structure; and
a dispersing medium in which the electrophoretic particles and the crosslinking agent are dispersed.

2. The electrophoretic particle dispersion according to claim 1, wherein the electrophoretic particles comprise at least two kinds of electrophoretic particles having different colors, and different curvatures at the surface of the curvature-adjustment portion.

3. The electrophoretic particle dispersion according to claim 2, wherein the curvature-adjustment material of the at least two kinds of electrophoretic particles is the same material.

4. The electrophoretic particle dispersion according to claim 1, comprising only one kind of the crosslinking agent.

5. The electrophoretic particle dispersion according to claim 1, wherein the curvature-adjustment material comprises silica.

6. The electrophoretic particle dispersion according to claim 1, wherein the crosslinking agent comprises a copolymer formed by using a monomer having a functional group selected from an acidic group, a basic group, a hydroxyl group, or a phenyl group.

7. The electrophoretic particle dispersion according to claim 1, wherein the curvature-adjustment portion comprises second particles, the second particles having an average particle diameter that is smaller than the average particle diameter of the first particles, and the crosslinking agent is capable of binding the second particles of one electrophoretic particle with the second particles of another electrophoretic particle via a reversible crosslinked structure.

8. The electrophoretic particle dispersion according to claim 7, wherein the electrophoretic particles comprise at least two kinds of electrophoretic particles having different colors, and the second particles that cover the at least two kinds of electrophoretic particles have different average particle diameters.

9. The electrophoretic particle dispersion according to claim 8, wherein the second particles that cover the at least two kinds of electrophoretic particles are formed from the same material.

10. A display medium comprising a pair of substrates, at least one of the pair of substrates being transparent; and an electrophoretic particle dispersion liquid positioned between the pair of substrates, the electrophoretic particle dispersion liquid comprising:
electrophoretic particles comprising first particles having a surface thereof covered with a curvature-adjustment portion formed from a curvature-adjustment material, a curvature at the surface of the curvature-adjustment portion being greater than the curvature of the first particles that do not comprise the curvature-adjustment portion;

a crosslinking agent capable of binding the electrophoretic particles via a reversible crosslinked structure; and a dispersing medium in which the electrophoretic particles and the crosslinking agent are dispersed.

11. The display medium according to claim 10, wherein the electrophoretic particles comprise at least two kinds of electrophoretic particles having different colors, and different curvatures at the surface of the curvature-adjustment portion.

12. The display medium according to claim 11, wherein the curvature-adjustment material of the at least two kinds of electrophoretic particles is the same material.

13. The display medium according to claim 10, comprising only one kind of the crosslinking agent.

14. The display medium according to claim 10, wherein the curvature-adjustment material comprises silica.

15. The display medium according to claim 10, wherein the crosslinking agent comprises a copolymer formed by using a monomer having a functional group selected from an acidic group, a basic group, a hydroxyl group, or a phenyl group.

16. The display medium according to claim 10, wherein the curvature-adjustment portion comprises second particles, the second particles having an average particle diameter that is smaller than the average particle diameter of the first particles, and the crosslinking agent is capable of binding the second particles of one electrophoretic particle with the second particles of another electrophoretic particle via a reversible crosslinked structure.

17. The display medium according to claim 16, wherein the electrophoretic particles comprise at least two kinds of electrophoretic particles having different colors, and the second particles that cover the at least two kinds of electrophoretic particles have different average particle diameters.

18. The display medium according to claim 17, wherein the second particles that cover the at least two kinds of electrophoretic particles are formed from the same material.

19. A display device comprising a pair of substrates, at least one of the pair of substrates being transparent; an electrophoretic particle dispersion liquid positioned between the pair of substrates; and a voltage application unit that applies a voltage to the pair of substrates, the electrophoretic particle dispersion liquid comprising:

electrophoretic particles comprising first particles having a surface thereof covered with a curvature-adjustment portion formed from a curvature-adjustment material, a curvature at the surface of the curvature-adjustment portion being greater than the curvature of the first particles that do not comprise the curvature-adjustment portion;

a crosslinking agent capable of binding the electrophoretic particles via a reversible crosslinked structure; and a dispersing medium in which the electrophoretic particles and the crosslinking agent are dispersed.

* * * * *